United States Patent [19]

Jackson

[11] Patent Number: 5,193,280
[45] Date of Patent: Mar. 16, 1993

[54] SAW BLADES AND METHOD OF MAKING SAME

[75] Inventor: Brian K. Jackson, Newton Aycliffe, England

[73] Assignee: Black & Decker, Inc., Newark, Del.

[21] Appl. No.: 839,589

[22] Filed: Feb. 21, 1992

[30] Foreign Application Priority Data

Feb. 25, 1991 [GB] United Kingdom ............ 9103883.6

[51] Int. Cl.$^5$ .............................................. B26B 9/02
[52] U.S. Cl. ...................................... 30/350; 30/355; 30/369; 125/22
[58] Field of Search ................. 30/369, 348, 350, 355; 83/792, 697, 838, 847, 839, 846, 851; 76/112; 125/16.01, 18, 22

[56] References Cited

U.S. PATENT DOCUMENTS

| | | | |
|---|---|---|---|
| 2,442,153 | 5/1948 | Pyl | 76/112 |
| 3,496,973 | 2/1970 | Ballard | 30/350 |
| 3,988,955 | 11/1976 | Engel et al. | 30/350 |
| 4,893,411 | 1/1990 | Leini | 30/369 |
| 4,969,270 | 11/1990 | Berghauser et al. | 30/369 |
| 4,979,305 | 12/1990 | Leini | 30/369 |
| 5,018,276 | 5/1991 | Asada | 30/347 |

FOREIGN PATENT DOCUMENTS

| | | |
|---|---|---|
| 0267311 | 5/1988 | European Pat. Off. |
| 0275860 | 7/1988 | European Pat. Off. |
| 0293941 | 12/1988 | European Pat. Off. |
| 0361875 | 4/1990 | European Pat. Off. |
| 0376128 | 7/1990 | European Pat. Off. |
| 68684 | 11/1892 | Fed. Rep. of Germany |
| 252251 | 10/1912 | Fed. Rep. of Germany |
| 878477 | 6/1953 | Fed. Rep. of Germany |
| 1230345 | 12/1966 | Fed. Rep. of Germany |
| 1933230 | 1/1971 | Fed. Rep. of Germany |
| 1964344 | 7/1971 | Fed. Rep. of Germany |
| 2318378 | 9/1974 | Fed. Rep. of Germany |
| 2443668 | 3/1976 | Fed. Rep. of Germany |
| 3039063 | 5/1982 | Fed. Rep. of Germany |
| 3236045 | 3/1984 | Fed. Rep. of Germany |
| 3638404 | 5/1988 | Fed. Rep. of Germany |
| 3724913 | 2/1989 | Fed. Rep. of Germany |
| 3838844 | 5/1990 | Fed. Rep. of Germany |
| 59-200766 | 11/1984 | Japan |
| 1299640 | 12/1978 | United Kingdom |

*Primary Examiner*—Frank T. Yost
*Assistant Examiner*—Hwei-Siu Payer
*Attorney, Agent, or Firm*—Dennis A. Dearing; Charles E. Yocum; Edward D. C. Bartlett

[57] ABSTRACT

A saw blade for a two-blade, contra-reciprocating saw has two strips spot welded together. Teeth are formed by scallops cut along an edge of each strip with lands between these scallops. Abrasive grit, such as tungsten carbide chips, is brazed on the teeth except on the sides of the teeth which rub against each other as the blades reciprocate. The main cutting surfaces are the lands which are longer on one strip than the other. The arrangement is useful for cutting masonry and metal products and reduces stresses on the blade.

11 Claims, 2 Drawing Sheets

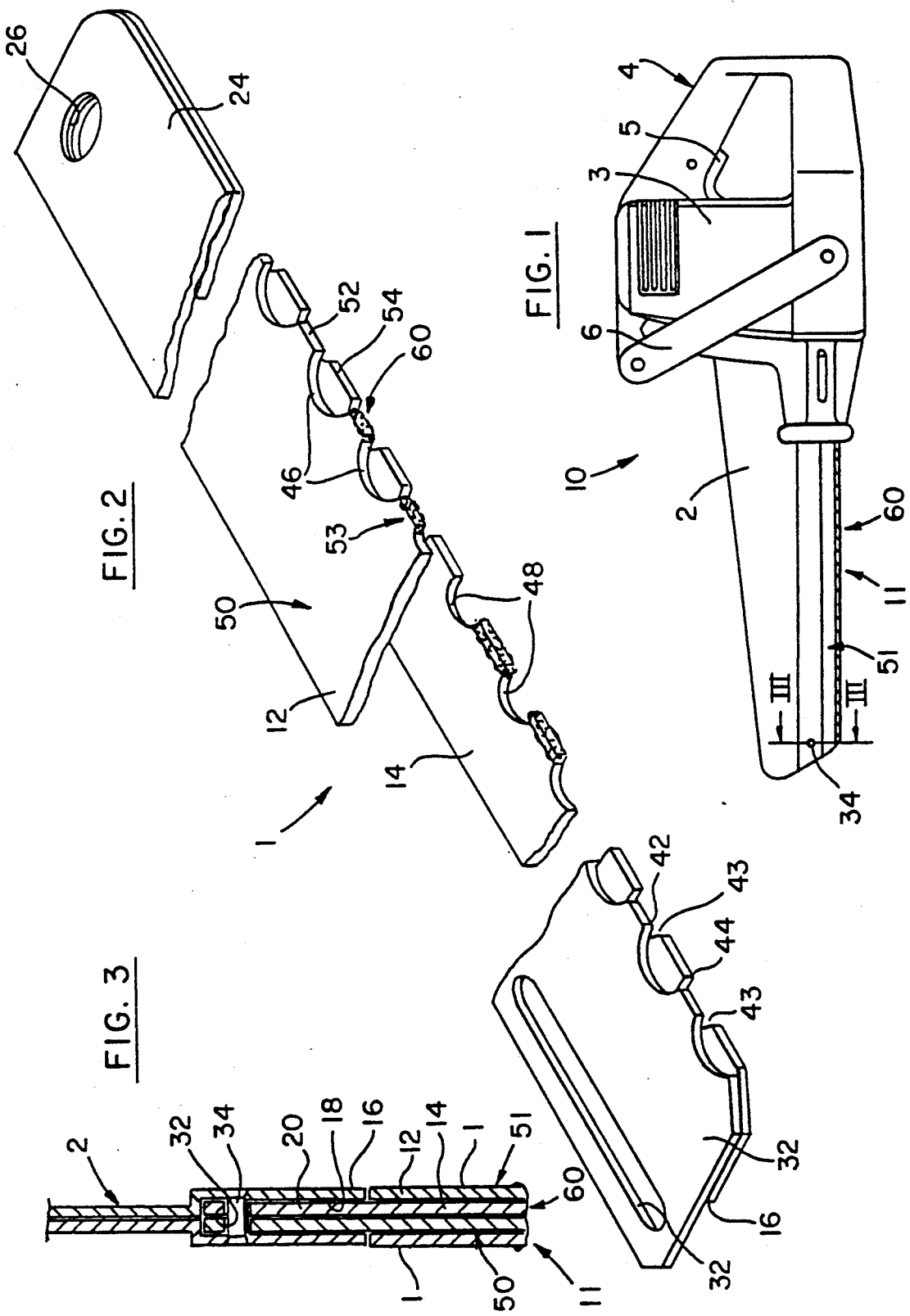

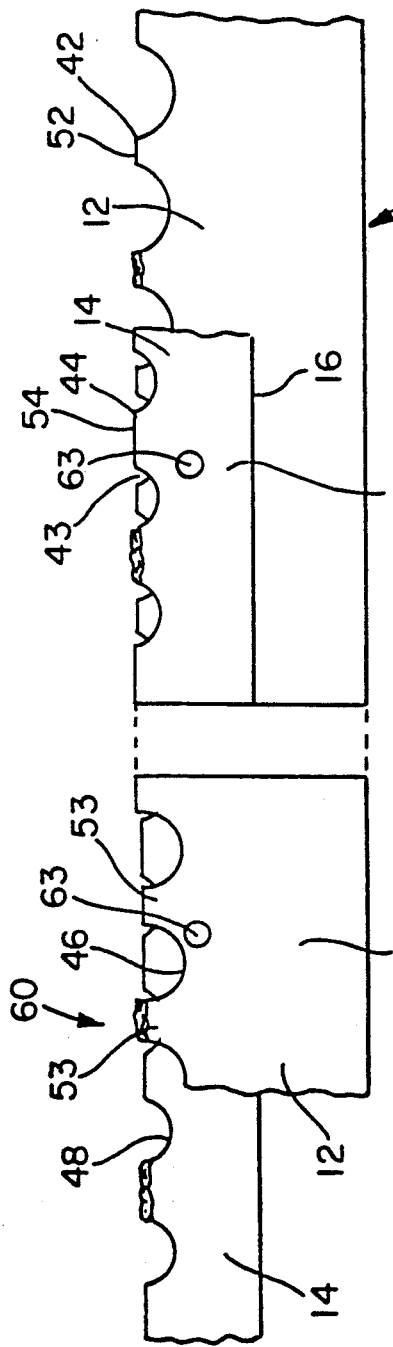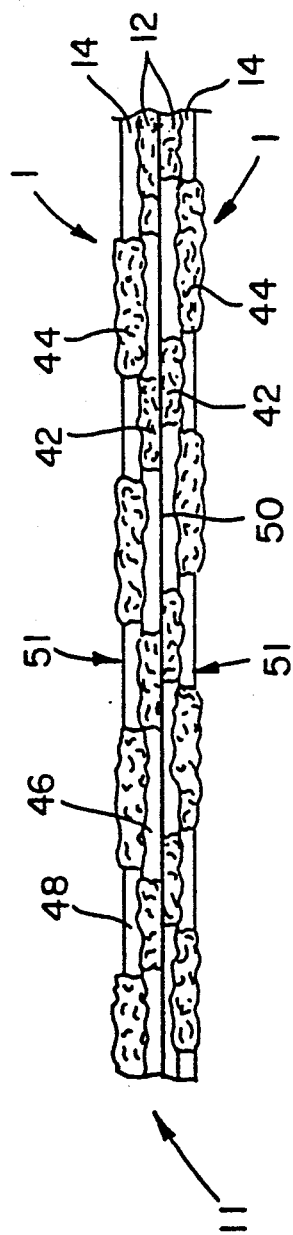

SAW BLADES AND METHOD OF MAKING SAME

FIELD OF THE INVENTION

This invention relates to saw blades, and particularly to saw blades for power saws of the type comprising a support guide for a pair of blades reciprocating with respect to one another.

BACKGROUND OF THE INVENTION

Such saws are known and may include blades formed with integral teeth which are ground and set to particular requirements. These blades are suitable for wood and plastics but not for some manufactured materials such as chipboard. Blades are also known, for example from EP-A-0361875, which incorporate tungsten carbide teeth set in the blade. These are suitable for cutting such material as chipboard. Indeed this design has been found particularly effective because alternate facing teeth on each blade have chamfered faces firstly towards and secondly away from each other. Those teeth chamfered towards one another urge the two reciprocating blades together during their passage through the material being cut, (and themselves very effectively cut material by a scissor action as they pass one another) so that ingression of loose cut material between the blades is minimised; while those teeth chamfered away from one another rip out the inside of the groove being cut in the material so as to make room for the blade's passage through the material.

Although this design is very effective, even when they are employed for cutting such masonry products as breeze blocks and the like the life of the blade is nevertheless considerably shortened in this sort of environment. In the first place tooth breakage sometimes occurs and this may be caused for several reasons; for example, a tooth simply hitting, and fracturing on impact with, a particularly hard region of material being cut; or two teeth in scissor action crushing between them a particularly hard grain. In the second place, with such granular masonry material as breeze blocks and the like, excessive wear occurs between the teeth, particularly where the shape of the teeth causes them to be pressed together.

Thirdly, a possibly unrelated problem with the blades described in the above-mentioned specification is beginning to come to light, and which is probably caused by using the saw in such arduous conditions. This problem is that, with this construction, blades appear to be snapping on occasion adjacent their root in the saw. This again may be caused by teeth impacting hard regions and the blade buckling near its root where it is unsupported by the saw blade support guide.

SUMMARY OF THE INVENTION

Thus it is an object of the present invention to provide a saw blade which overcomes the above-mentioned disadvantages, or at least mitigates their effects.

In accordance with this invention there is provide a saw blade for a contra-reciprocating two-blade saw including a support guide for said blades, the blade comprising a first strip having teeth formed thereon and grit particles adhered on one side of said teeth and a second strip secured against said one side of the first strip and having teeth formed thereon in staggered relation to the teeth formed on said first strip, the teeth on said second strip having grit particles adhered thereto. Said grit particles may be tungsten carbide chips or cubic boron nitride particles or such other similar manmade hard material particles which are adhered to the teeth by appropriate brazing or plating technique.

Preferably said teeth are flat lands separated by curved scallops along the edge of said strips.

There is also provided a method of making a blade as defined above, comprising the steps of: forming teeth in first and second strips of metal; securing said strips together in side by side relation with the tips of said teeth lying in substantially the same plane, and in staggered relation one set of teeth with respect to the other; masking one side of said first strip remote the second strip; applying adhesive to the tips of the teeth exposed by said masking; applying grit particles to said adhesive; and removing said masking and curing said adhesive.

Preferably said adhesive is brazing paste, said grit particles are tungsten carbide chips and said curing is heating sufficiently to braze the chip particles to said teeth. Alternatively, the grit particles may be such other manmade materials as cubic boron nitride and said adhesive may be a plating medium.

Preferably said first strip is deeper than said second strip which thereby forms a shoulder on said first strip for co-operation with the edge of a slot formed in said support guide, said slot being adapted to receive the first strips of two blades disposed side by side with said second strips facing outwardly. Thus the absence of grit particles on the side of the first strip remote from the second strip means that the first strips of adjacent blades can reciprocate with respect to one another without mutual interference.

The two strips reinforce one another and so the blade as a whole may be constructed longer. Moreover, since the teeth are flattened, and are staggered with respect to one another on each strip, they perform more of a grinding action when cutting so that there are less longitudinal stresses on the blade. Consequently the aforementioned problems of teeth, or even the blade, snapping should be substantially al eviated. Also the grinding nature of the material being cut will have less effect on the cutting surfaces of the saw blades than occurs where teeth are meshing in a scissor action.

BRIEF DESCRIPTION OF THE DRAWING

The invention is further described hereinafter, by way of example only, with reference to the accompanying drawings, in which:

FIG. 1 is a side view of a power saw adapted to receive a blade according to the present invention;

FIG. 2 is a perspective cut-away view of a blade according to the invention;

FIG. 3 is a section on the line III—III in FIG. 1 showing a pair of blades in a slotted guide;

FIG. 4a and 4b are views from either side of the blade of FIG. 2; and

FIG. 5 is a partial bottom view of the pair of blades of FIG. 3.

DETAILED DESCRIPTION OF THE PREFERRED EMBODIMENT

In FIG. 1, a power saw 10 has a pair 11 of blades 1 supported in a slotted guide 2 connected to a housing 3 for a motor. The motor drives the blades 1 in contra-reciprocation with respect to one another. The saw has a handle 4 and switch 5 and a further, steadying handle 6.

Each blade 1 (see FIGS. 2 and 3) comprises two strips of steel 12, 14 secured together, the first strip 12 being wider than the second strip 14 to form a shoulder 16. Two blades 1 are supported in the guide 2 which includes a slot 18 to receive those parts 20 of each strip 12 which extend beyond shoulder 16.

The shoulder 16 bears on the ends of the slot 18. Each blade 1, at its housing end 24, is provided with a reinforced threaded eye 26 which is engaged by a correspondingly threaded driving pin (not shown) driven by the motor. At its free end 30, each blade 1 has a slot 32 through which a pin 34, releasably secured in the guide 2, passes, so as to support the blades 1 (with freedom to reciprocate along their axes) at their free ends.

Teeth 42, 44 are formed on the adjacent edges of each strip 12, 14. The teeth 42, 44 have the same pitch and alternate with respect to one another. The teeth 42, 44 are formed by scallops 46, 48 separated by lands 52, 54. The scallops 46 in the strip 12 are deeper, and have a larger radius, than those of the strip 14, so that the lands 54 are longer than those on the strip 12. This is because the lands 54 are the main cutting surfaces of the blade pair 11. This also ensures that there is a diagonal gap 43 between facing corners of adjacent teeth on either strip, for reasons explained further below.

All the teeth 42, 44 are provided with a coating of grit particles (shown on only some of the teeth in the drawings). This is achieved by applying to the teeth a brazing paste and dipping them in tungsten carbide chips. Subsequent heating to about 1000 C bonds the chips to the teeth in a known process and results in an abrasive coating to the lands and sides of the teeth 42, 44. Other particles and other adhesive techniques could be employed.

However, the sides 50 of the strips 12 which face one another when positioned in the saw 10, (which sides are remote from the strips 14) bear against each other during their contra-reciprocation in the guide 2. Consequently the sides 53 of the teeth 42 on that side 50 of strips 12 cannot have grit applied to them, otherwise the teeth 42 on one strip 12 would bind with those on the other strip. Thus prior to the application of brazing paste, masking tape is applied to the strip 12 along side 50 up to the level of lands 52. Thus when the teeth 42, 44 are dipped in the brazing paste the sides 50 of the teeth 42 are masked. The masking tape is removed before the heating step, either before or after the grit is applied. Other means of masking that side of the strip 12 could be employed.

The grit particles are of a size substantially the same as the thickness of the strips 12, 14. This results in a degree of overlap, in the transverse direction with respect to the length of the blade, between teeth 42, 44 as shown in FIG. 5. The diagonal gap 43 is provided to allow grit to occupy the space between opposing teeth 42, 44 on the blade 1. Also, the outer grit coating on teeth 44 stands somewhat proud of the side 51 of each strip 12. Thus during the sawing action the blades 1 are pressed against one another and the arrangement of the alternating teeth 42, 44 simulates a wave action down the length of the blade which assists this pressing together of the blades. Moreover, with the bottom edge 60 of the blade pair 11 providing a largely continuous surface, the cutting action is primarily a grinding process, very effective with granular masonry material such as breeze block. The scallops 46, 48 assist clearance. Dust getting between the blades 1 will always be a problem, but it does not affect the cutting surfaces o cutting action of the blade. There is of course a scissor action between teeth 42 but this is not part of the cutting action of the blade arrangement.

While the blades are primarily designed for cutting masonry products, it can also be used to good effect on metals, although in this latter respect a long blade is not required.

Finally, the nature of the cutting action of the blades 1 is itself responsible for a reduction of the longitudinal stresses on the blade. Nevertheless, there is the unavoidable scissor action between the teeth 42 which could still trap hard particles between them. However, the teeth 42, 44 are not themselves hard, being formed from strip steel, and so will absorb impacts without shattering. Moreover, the strip 14 serves to reinforce the strip 12, particularly at the root of the blade near its end 24 where it exits the slot 18 and is laterally unsupported. It is here that blade breakage has sometimes occurred in the past.

The two strips are conveniently spot welded together, at about every third tooth, as shown at 63 in FIG. 4.

What is claimed is:

1. A blade for a contra-reciprocating two-blade saw including a support guide for the blades, the blade comprising:
   first and second strips secured together to form a single unitary blade;
   said first strip having teeth formed thereon;
   grit particles adhered to the teeth on only one side of said first strip;
   said second strip being secured to said one side of the first strip;
   said second strip having teeth formed thereon in staggered relation to the teeth formed on said first strip;
   the teeth on said second strip having grit particles adhered thereto;
   said teeth comprising flat lands separated by curved scallops along an edge of each said strip; and
   the teeth having a pitch which is the same on each strip, with the lands on the second strip being longer than the lands on the first strip.

2. The blade as claimed in claim 1, wherein the lands have corners, and a diagonal gap is provided between opposing corners of the lands of adjacent teeth on the first and second strips.

3. A saw blade for a two-blade, contra-reciprocating saw, the blade comprising:
   two elongate strips of steel disposed side-by-side and spot welded together;
   an edge of each strip having teeth formed therealong, said teeth being formed by scallops separated by raised flat lands;
   abrasive grit particles adhered on said teeth, the teeth on one of said strips having no grit particles on a side thereof facing away from the other of said strips;
   the land on said other of said strips being longer than the lands on said one of said strips; and
   the longer lands forming the main cutting surfaces of the blade.

4. The saw blade of claim 3, wherein the teeth on said one strip having the same pitch as the teeth on said other strip with the lands of said one strip being staggered between the lands of said other strip.

5. The saw blade of claim 4 wherein said grit particles are of a size substantially the same as the thickness of the strips.

6. A saw blade, comprising:
two elongate strips disposed side-by-side and secured together to form a single blade extending in a lengthwise direction;
a plurality of teeth spaced apart in said lengthwise direction along a cutting edge of the blade;
said teeth being formed individually on both of said strips, the teeth on each strip being formed by raised lands separated by scallops;
the teeth on one strip alternating in said lengthwise direction with the teeth on the other strip;
the land of the teeth of said one strip being longer than the lands of the teeth of said other strip; and
abrasive particles adhered on the teeth of both strips.

7. The saw blade of claim 6, wherein said strips are secured together by spot welding.

8. The saw blade of claim 6, wherein the teeth on said one strip have a pitch which is the same as that of the teeth on said other strip.

9. The saw blade of claim 6, wherein the size of said abrasive particles and the thickness of each strip are substantially the same.

10. The saw blade of claim 6, wherein:
the strips are secured together by welding;
the teeth on said one strip have a pitch which is the same as the pitch of the teeth on said other strip;
the strips are of unequal height to form a shoulder extending in said lengthwise direction along one side of the blade; and
the teeth of the greater in height of the two strips having no abrasive particles adhered on a side facing away from the lesser in height of the two strips.

11. The saw blade of claim 10, wherein the abrasive particles comprise tungsten carbide.

* * * * *

UNITED STATES PATENT AND TRADEMARK OFFICE
CERTIFICATE OF CORRECTION

PATENT NO. : 5,193,280
DATED : March 16, 1993
INVENTOR(S) : JACKSON

It is certified that error appears in the above-identified patent and that said Letters Patent is hereby corrected as shown below:

In Claim 3, column 4, line 58, change "land" to --lands--.

In Claim 4, column 4, Line 63, change "having" to --have--.

In Claim 6, column 5, line 14, change "land" to "lands--.

Signed and Sealed this

Twenty-third Day of November, 1993

Attest:

BRUCE LEHMAN

*Attesting Officer*     *Commissioner of Patents and Trademarks*